Patented Apr. 12, 1932

1,853,534

UNITED STATES PATENT OFFICE

JESSE OATMAN BETTERTON, OF OMAHA, NEBRASKA, ASSIGNOR TO AMERICAN SMELTING AND REFINING COMPANY, OF NEW YORK, N. Y., A CORPORATION OF NEW JERSEY

REMOVAL OF BISMUTH FROM LEAD

No Drawing. Application filed April 5, 1929, Serial No. 352,913. Renewed September 3, 1931.

This invention relates to the refining of metals, and more particularly, to the removal of bismuth from desilverized lead.

In accordance with the invention calcium is utilized as a reagent in the removal of bismuth and is applied to the lead in the form of a lead calcium alloy. The bismuth and part of the calcium enter the dross which may be removed and treated in any convenient manner for the recovery of these elements. The remainder of the calcium is removed from the lead by the addition of chlorine which unites with the calcium to form a calcium chloride slag. After the latter is removed the metal of the bath will conform to refined lead specifications and will be in a marketable condition.

Considering the invention more in detail the process may be carried out by filling a kettle with molten lead which has recently been desilverized in a manner well known in the art. The bath is maintained at a temperature of 700° F. and the oxide dross is removed in any suitable manner.

Blocks and rims formed in previous processes, as will be fully described, are then added to the bath and allowed to melt therein. The alloy of calcium and lead is then added to the kettle which is maintained at a temperature of 660° F. and allowed to melt therein. After the blocks and rims and the alloy have become molten the bath may be stirred for a sufficient period of time to form a uniform mixture throughout, the temperature preferably being held at approximately 660° F. during the stirring operation.

After the desired mixture has been obtained the dross containing the major portion of the bismuth may be removed by skimming and treating in any desired manner for the recovery of the metal values therein. The kettle is then slowly cooled and blocks and rims are formed from the portion of the metal which first solidifies. These blocks and rims contain the remainder of the bismuth and leave the bath practically free from that element. They may be added to subsequent charges for the recovery of their metal content as previously pointed out.

After the formation of the blocks and rims the kettle may be again heated and scraped to remove the metal which has solidified adjacent the sides thereof, the scrapings being added to the blocks previously formed.

The lead will now contain from .03% to .05% of calcium which must be removed in accordance with refined lead specifications to render the lead suitable for the market. This removal is accomplished by heating the bath to a temperature of 750° F. and adding a sufficient amount of zinc chloride thereto to completely cover the surface and form a seal. The zinc chloride cover is essential in preventing air from contacting with the lead of the bath and in preventing the lead from oxidizing. This cover prevents the formation of litharge which would be infusible at the temperature employed. In addition the calcium reacts with the zinc and lead chlorides to form calcium chloride whereby the calcium is completely removed from the bath. Chlorine gas is then introduced into the lead in any convenient manner in sufficient quantities to unite with calcium to form calcium chloride and to produce an excess of lead chloride which may be utilized in removing the calcium from the bismuth dross above mentioned. The slag of zinc chloride and calcium chloride may then be removed and the refined lead pumped to a suitable container for subsequent use.

As a specific example of the above process, a quantity of 567.9 tons of lead containing .096% of bismuth were treated together with 44.6 tons of blocks and rims containing 69.1 lbs. of calcium and 243.55 lbs. of bismuth, 26,135 lbs. of the calcium lead alloy containing 957.47 lbs. of calcium, or 1.69 lbs. of calcium per ton of lead were added together with the blocks and rims and stirred at 660° F. for approximately 55 minutes. The bismuth dross containing 1.19% bismuth and 1.01% calcium was removed by skimming, the skimming operation requiring 2 hours and 45 minutes. This dross was later treated for the recovery of the metal values. After the removal of the dross the bath was suitably cooled to form the blocks and rims which contained .257% bismuth and .072% calcium, this step requiring approximately 2 hours.

After the removal of the blocks and rims the kettle was reheated and scraped. The bath was then maintained at a temperature of 750° F. and zinc chloride was added to form a skim over the top of the bath and chlorine gas was introduced in sufficient quantities to unite with the calcium and form a calcium chloride slag which was removed by skimming. The final lead, after the removal of the slag, contained .045% bismuth and .0023% calcium. The total time for treating the above quantity of lead involved approximately 8 hours for the bismuth operation and approximately 5 hours for the calcium removal.

The above specific example of the process has been given by way of illustration only. It is obvious that the times involved in the various steps of the process and the percentages of materials employed may be varied within wide limits depending upon the material under treatment.

The invention is applicable to the removal of bismuth from various metals and is not to be limited to the treatment of lead.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of removing bismuth from refined metals which comprises heating said metals, adding a calcium alloy thereto, removing the bismuth as a dross and removing the calcium by the addition of chlorine whereby calcium chloride dross is produced.

2. The process of treating metals for the recovery of bismuth which comprises heating said metals to a temperature above the melting point thereof, adding calcium thereto, whereby a dross is formed containing a large portion of the bismuth, cooling said metal to its melting point, whereby the solidified portion will contain a substantial part of the remainder of the bismuth, removing said solidified portion, re-heating said metal, applying a quantity of zinc chloride thereto to form a coating over the surface thereof, and applying chlorine gas to said metal to unite with the calcium and form a slag and removing the slag of calcium chloride and zinc chloride, the metal of the bath being substantially freed from calcium and bismuth.

3. The process of refining lead for the removal of bismuth which comprises melting said lead to form a bath, adding calcium to said bath and stirring for a sufficient period of time to form an intimate mixture, removing the dross, applying zinc chloride thereto to form a coating over the surface thereof, adding chlorine to said bath to unite with the calcium and form a calcium chloride slag, removing said slag containing calcium chloride and zinc chloride, whereby the metal of the bath is substantially freed from bismuth and calcium.

4. The process of refining lead for the removal of bismuth which comprises melting said lead to form a bath, adding calcium lead alloy to said bath and stirring for a sufficient period of time to form an intimate mixture, and removing the dross, adding chlorine to said bath to unite with the calcium and form a calcium chloride slag, and removing said slag containing calcium chloride, whereby the metal of the bath is substantially freed from bismuth and calcium.

5. The process of refining lead for the removal of bismuth which comprises melting said lead to form a bath, adding calcium to said bath and stirring for a sufficient period of time to form an intimate mixture, removing the dross and cooling the kettle to form blocks and rims which are removed and treated for the recovery of the metal therefrom, reheating said bath, adding chlorine to said bath to unite with the calcium and form a slag, and removing said slag containing calcium chloride, whereby the metal of the bath is substantially freed from bismuth and calcium.

6. The process of refining lead for the removal of bismuth which comprises melting said lead to form a bath, adding a calcium lead alloy to said bath and stirring for a sufficient period of time to form an intimate mixture, removing the dross and cooling the kettle to form blocks and rims which are removed and treated for the recovery of the metal therefrom, reheating said bath, applying zinc chloride thereto to form a coating over the surface thereof, adding chlorine to said bath to unite with the calcium and form a calcium chloride slag, and removing said slag containing calcium chloride and zinc chloride, whereby the metal of the bath is substantially freed from bismuth and calcium.

7. The process of refining lead for the removal of bismuth which comprises melting said lead to form a bath, heating the bath and removing the oxide dross therefrom, adding a calcium lead alloy to said bath and stirring for a sufficient period of time to form an intimate mixture, removing the dross and cooling the kettle to form blocks and rims which are removed and treated for the recovery of the metal therefrom, reheating said bath, applying zinc chloride thereto to form a coating over the surface thereof, adding chlorine to said bath to unite with the calcium and form a slag, and removing said slag containing calcium chloride and zinc chloride, whereby the metal of the bath is substantially freed from bismuth and calcium.

8. The process of refining lead for the removal of bismuth which comprises melting said lead to form a bath, adding calcium to said bath and stirring at a temperature of approximately 660° F. for a sufficient period of time to form an intimate mixture, removing the dross at a temperature of approximately 660° F., heating said bath to a temperature of approximately 750° F., applying zinc chloride thereto to form a coating over the surface thereof, adding to said bath sufficient chlorine gas to unite with the calcium to form calcium chloride slag and to form an excess of lead chloride sufficient for the later purification of the bismuth dross, and removing said slag containing calcium chloride and zinc chloride, whereby the metal of the bath is substantially freed from bismuth and calcium.

9. The process of refining lead for the removal of bismuth which comprises melting said lead to form a bath, heating the bath to a temperature of approximately 700° F. and removing the oxide dross therefrom, adding a calcium lead alloy, and blocks and rims from a previous run to said bath and stirring at a temperature of approximately 660° F. for a sufficient period of time to form an intimate mixture, removing the dross at a temperature of approximately 660° F. and cooling the kettle to form blocks and rims which are removed and added to the bath in subsequent runs, heating said bath to a temperature of approximately 750° F., applying zinc chloride thereto to form a coating over the surface thereof, adding chlorine to said bath to unite with the calcium and form a slag, and removing said slag containing calcium chloride and zinc chloride, whereby the metal of the bath is substantially free from bismuth and calcium.

10. The process of refining lead for the removal of bismuth which comprises melting said lead to form a bath, heating the bath to a temperature of approximately 700° F. and removing the oxide dross therefrom, adding a calcium lead alloy, and blocks and rims from a previous run to said bath and stirring at a temperature of approximately 660° F. for a sufficient period of time to form an intimate mixture, removing the dross at a temperature of approximately 660° F. and cooling the kettle to form blocks and rims which are removed and added to the bath in subsequent runs.

11. The process of refining lead for the removal of bismuth which comprises melting said lead to form a bath, adding a calcium lead alloy to said bath and stirring at a temperature of approximately 660° F. for a sufficient period of time to form an intimate mixture, removing the dross at a temperature of approximately 660° F. and cooling the kettle to form blocks and rims which are removed and treated for the recovery of the metal therefrom.

12. The process of refining lead for the removal of bismuth which comprises melting said lead to form a bath, heating the bath to a temperature of approximately 700° F. and removing the oxide dross therefrom, adding a calcium lead alloy to said bath and stirring at a temperature of approximately 660° F. for a sufficient period of time to form an intimate mixture, removing the dross at a temperature of approximately 660° F. and cooling the kettle to form blocks and rims which are removed and treated for the recovery of the metal therefrom.

13. The process of treating lead for the removal of calcium therefrom which comprises adding a zinc chloride cover to a bath of molten lead and causing said cover to completely seal the bath and prevent access of air thereto and adding chlorine gas to the bath beneath said cover whereby calcium chloride is produced and forms a dross which may be removed from the bath.

14. The process of treating lead to remove calcium therefrom which comprises heating said lead to a temperature of approximately 750° F., adding zinc chloride thereto in sufficient quantities to completely cover the bath and adding chlorine to react with the calcium and produce calcium chloride which forms a dross and removing the chloride dross from the bath.

15. The process of removing bismuth from refined lead which comprises heating said lead to form a bath, adding a calcium alloy thereto whereby a high bismuth dross is obtained, removing said dross, applying a zinc chloride cover to said bath in sufficient quantities to completely cover said bath and form a seal and adding chlorine gas to said bath to unite with the calcium and form a calcium chloride dross and removing the dross from the bath.

16. The process of refining lead contaminated with bismuth for the removal thereof to produce a refined lead, which comprises melting said contaminated lead to form a molten bath, incorporating in said molten bath a calcium-yielding material capable of combining with bismuth to effect a removal thereof from the molten bath as a dross, and subsequently introducing in said molten bath a chloridizing reagent capable of removing calcium from the lead.

17. In the process of refining lead for the removal of bismuth with calcium, that improvement which comprises introducing chlorine gas into the body of molten lead after removal of bismuth therefrom while maintaining a slag coating on the surface of said molten bath to effect a removal of calcium as a calcium chloride dross.

In testimony whereof I have hereunto set my hand and seal.

JESSE OATMAN BETTERTON.